(12) United States Patent
Debucean et al.

(10) Patent No.: US 11,756,389 B2
(45) Date of Patent: Sep. 12, 2023

(54) SYSTEM AND METHOD FOR DETECTING SCAN AND NON-SCAN EVENTS IN A SELF CHECK OUT PROCESS

(71) Applicant: Everseen Limited, Blackpool (IE)

(72) Inventors: Caius-Ioan Debucean, Timis (RO); Robert Preda, Arad (RO)

(73) Assignee: Everseen Limited, Blackpool (IE)

( * ) Notice: Subject to any disclaimer, the term of this patent is extended or adjusted under 35 U.S.C. 154(b) by 316 days.

(21) Appl. No.: 17/144,483

(22) Filed: Jan. 8, 2021

(65) Prior Publication Data

US 2021/0216785 A1    Jul. 15, 2021

Related U.S. Application Data

(60) Provisional application No. 62/959,248, filed on Jan. 10, 2020.

(51) Int. Cl.
| | |
|---|---|
| *G07G 1/00* | (2006.01) |
| *G06N 3/08* | (2023.01) |
| *G06Q 20/18* | (2012.01) |
| *H04N 7/18* | (2006.01) |
| *G06V 20/52* | (2022.01) |

(Continued)

(52) U.S. Cl.
CPC ......... *G07G 1/0054* (2013.01); *G06F 18/214* (2023.01); *G06F 18/2415* (2023.01); *G06F 18/2431* (2023.01); *G06N 3/08* (2013.01); *G06N 7/01* (2023.01); *G06Q 20/18* (2013.01); *G06V 10/147* (2022.01); *G06V 10/764* (2022.01); *G06V 10/82* (2022.01); *G06V 20/41* (2022.01); *G06V 20/46* (2022.01); *G06V 20/52* (2022.01); *G06V 40/107* (2022.01); *G06V 40/11* (2022.01); *H04N 7/188* (2013.01); *G06V 20/44* (2022.01)

(58) Field of Classification Search
None
See application file for complete search history.

(56) References Cited

U.S. PATENT DOCUMENTS

| | | | |
|---|---|---|---|
| 6,711,293 B1 * | 3/2004 | Lowe | G06V 10/462 |
| | | | 382/220 |
| 9,064,161 B1 * | 6/2015 | Boman | G06V 20/40 |
| (Continued) | | | |

FOREIGN PATENT DOCUMENTS

WO    2006105376 A2    10/2006

*Primary Examiner* — Clifford Hilaire
(74) *Attorney, Agent, or Firm* — Young Basile Hanlon & MacFarlane, P.C.

(57) ABSTRACT

A system for detecting scan and non-scan events in a self-check out (SCO) process includes a a scanner for scanning objects and generating point of sale (POS) data, a video camera for generating a video of the scanning region, proximity sensors proximal to the video camera for defining an Area of Action (AoA), wherein the video camera starts capturing scanning region, when the objects enter the AoA, and the POS data includes non-zero values, an Artificial neural network (ANN) for receiving an image frame and generating one or more values, each indicating a probability of classification of the image frame into one or more classes respectively, and a processing unit for processing the POS data, and probabilities of one or more classes to detect a correlation between video data and POS data, and detect one of: scan and non-scan event in the image frame based on the correlation.

24 Claims, 6 Drawing Sheets

(51) Int. Cl.
*G06V 20/40* (2022.01)
*G06V 40/10* (2022.01)
*G06F 18/214* (2023.01)
*G06F 18/2415* (2023.01)
*G06F 18/2431* (2023.01)
*G06N 7/01* (2023.01)
*G06V 10/764* (2022.01)
*G06V 10/82* (2022.01)
*G06V 10/147* (2022.01)

(56) References Cited

U.S. PATENT DOCUMENTS

| | | | |
|---|---|---|---|
| 2002/0170782 A1* | 11/2002 | Millikan | G07G 1/0054 |
| | | | 186/61 |
| 2010/0059589 A1* | 3/2010 | Goncalves | G08B 13/248 |
| | | | 382/218 |
| 2013/0006787 A1 | 1/2013 | Izaka et al. | |
| 2019/0147709 A1 | 5/2019 | Schoner | |
| 2019/0354770 A1 | 11/2019 | Darvish | |
| 2020/0275059 A1* | 8/2020 | De Bonet | G06V 20/52 |
| 2021/0097526 A1* | 4/2021 | Edmiston | G06Q 20/386 |

* cited by examiner

SYSTEM AND METHOD FOR DETECTING SCAN AND NON-SCAN EVENTS IN A SELF CHECK OUT PROCESS

CROSS-REFERENCE TO RELATED APPLICATION(S)

This application claims priority to and the benefit of U.S. Provisional Patent Application No. 62/959,248, filed Jan. 10, 2020, the entire disclosure of which is hereby incorporated by reference.

TECHNICAL FIELD

The present disclosure relates generally to preventing retail product loss, and more specifically to identifying and alerting of occurrences of products not being scanned at a self-checkout counter.

BACKGROUND

Self-checkout point-of-sale (POS) terminals are well-known and typically include a scanning device such as a laser or optical scanner system that operates to identify a Uniform Product Code (UPC) label or bar code affixed to each item that a customer aims to purchase. To scan an item, a customer picks each item from a shopping cart, basket or other carrier, and one by one, passes each item over a scanning area built into the POS terminal to allow the laser scanner to detect the item's UPC code. On detecting and identifying the UPC code, the POS terminal interrogates a database to determine the price and identity of the scanned item. On successful completion of a scan, the POS terminal typically issues an audible tone to indicate that the item has been properly scanned. The item may then be placed in an output area for subsequent retrieval or packing in a shopping bag by the customer. In the meantime, the POS terminal maintains an aggregate purchase price for all of the items in the transaction. After all items in the transaction have been scanned as described above, the POS terminal displays the resulting aggregate purchase price to the customer who must then pay for the items purchased in that transaction.

However, conventional self-checkout POS terminals suffer from a variety of deficiencies. Specifically, operation of such systems can be compromised to allow a customer to gain possession of one or more items without paying for them. For example, a customer may purposefully or accidentally fail to scan an item as it moves through the checkout area. In such cases, the POS system never detects the un-scanned item and the purchase price of the item is never added to the aggregate purchase price for the overall transaction. Thus, the customer can receive one or more items for free; and over a prolonged period, a retailer may lose significant sums of money as a result. Similarly, a customer may unknowingly pass an item through the scanning area during a transaction and place the item into the item output without the item being scanned. For example, the customer may have failed to notice that the scanner failed to beep during scanning of an item.

A common approach used by fraudsters to prevent proper scanning is to cover or block an item's UPC label as it is passes by the scanner's detection window. In this case, the item is included with other items in the transaction (wherein each of these items may or may not have been correctly scanned), and the customer continues along with a transaction as if the item was properly scanned. In this way the non-scanning activity is concealed amongst the body of other scanned items in the transaction and the transaction will appear legitimate to an observer. After paying, the customer may leave a retail premises with all of the items, having only paid for those items that were properly scanned or entered into the POS system.

The designers of POS terminals have attempted to address this problem by the inclusion of an overhead camera into a checkout environment, to enable close observation of each scanning activity conducted at the relevant POS terminal. However, these measures can be defeated through clever manipulation of an item in a customer's hand so that it appears from overhead as if the UPC label was displayed to the scanner in the POS terminal, when in fact, the view of the UPC label by the scanner was blocked in some manner, for example, slightly rotating item in the user's hand as it passes by the scanner so that the UPC label is no longer visible to the scanner. Hence, in view of the above, there exists a need for a system that monitors self-checkout process, and identifies the unwanted behaviors.

SUMMARY

In an aspect of the present disclosure, there is provided a system for detecting scan and non-scan events in a self-check out (SCO) process that includes a scanner for scanning one or more objects brought up in a scanning region, and generating point of sale (POS) data based on the scanning. The system may further include a video camera disposed perpendicularly to the scanner and in an abutting arrangement with respect to the scanner for generating a stream of image frames of the scanning region. The system may further include one or more proximity sensors disposed proximally to the video camera and operable to define an Area of Action (AoA) disposed above the scanner, wherein the video camera is configured to start capturing the scanning region, when the one or more objects enter the AoA, and the POS data includes one or more non-zero values. The system may further include an artificial neural network (ANN) for receiving an image frame from the video camera, and generating one or more values, each indicating a probability of classification of the image frame into one or more classes respectively. The system may further include a processing unit for receiving and processing the POS data, and one or more probabilities of one or more classes to detect a correlation between video data generated by the video camera, and POS data, detect one of: scan and non-scan event in the image frame based on the correlation, and generate an alert upon detection of the non-scan event.

In another aspect of the present disclosure, there is provided a method for detecting scan and non-scan events in a SCO process. The method includes scanning, by a scanner, one or more objects brought up in a scanning region, and POS data based on the scanning. The method may further include operably defining, by one or more proximity sensors, an AoA above the scanner. The method may further include generating a triggering signal, by one or more proximity sensors, when the one or more objects enter the AoA. The method may further include capturing, by a video camera, a stream of image frames of the scanning region upon generation of the triggering signal, wherein the video camera is disposed perpendicularly to the scanner and in an abutting arrangement with respect to the scanner. The method may further include receiving, by an ANN, an image frame and generating one or more values, each indicating a probability of classification of the image frame into one or more classes respectively. The method may further include receiving and processing, by a processing unit, the POS data, and one or more probabilities of the one or more classes to detect a correlation between video data generated by the video camera, and POS data. The method may further include detecting, by the processing unit, one of: scan and non-scan event in the image frame based on the correlation, and generating, by the processing unit, an alert upon detection of the non-scan event.

In yet another aspect of the present disclosure, there is provided a computer programmable product for detecting scan and non-scan events in a SCO process, the computer programmable product comprising a set of instructions. The set of instructions when executed by a processor causes the processor to scan one or more objects brought up in a scanning region, and generate POS data based on the scanning, operably define an AoA above the scanning region, generate a triggering signal, by one or more proximity sensors, when the one or more objects enter the AoA, capture a stream of image frames of the scanning region upon generation of the triggering signal, receive an image frame and generate one or more values, each indicating a probability of classification of the image frame into one or more classes respectively, receive and process the POS data, and one or more probabilities of the one or more classes to detect correlation between video data and POS data, detect one of: scan and non-scan event in the image frame based on the correlation, and generate an alert upon detection of the non-scan event.

Various embodiments of the present disclosure provide the following advantages:
(a) A more tightly packed hardware system, enabling easier deployment and configuration of the system, since the video camera and the scanner are always disposed in the same position relative to each other; and
(b) Improved customer privacy, since a customer's head and torso that would otherwise appear in a top-down camera view, are not present within the field of view of the video camera.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. To illustrate the present disclosure, exemplary constructions of the disclosure are shown in the drawings. However, the present disclosure is not limited to the specific methods and instrumentalities disclosed herein. Moreover, those in the art will understand that the drawings are not to scale. Wherever possible, like elements have been indicated by identical numbers.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF ILLUSTRATIVE EMBODIMENTS

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Figure 1A:
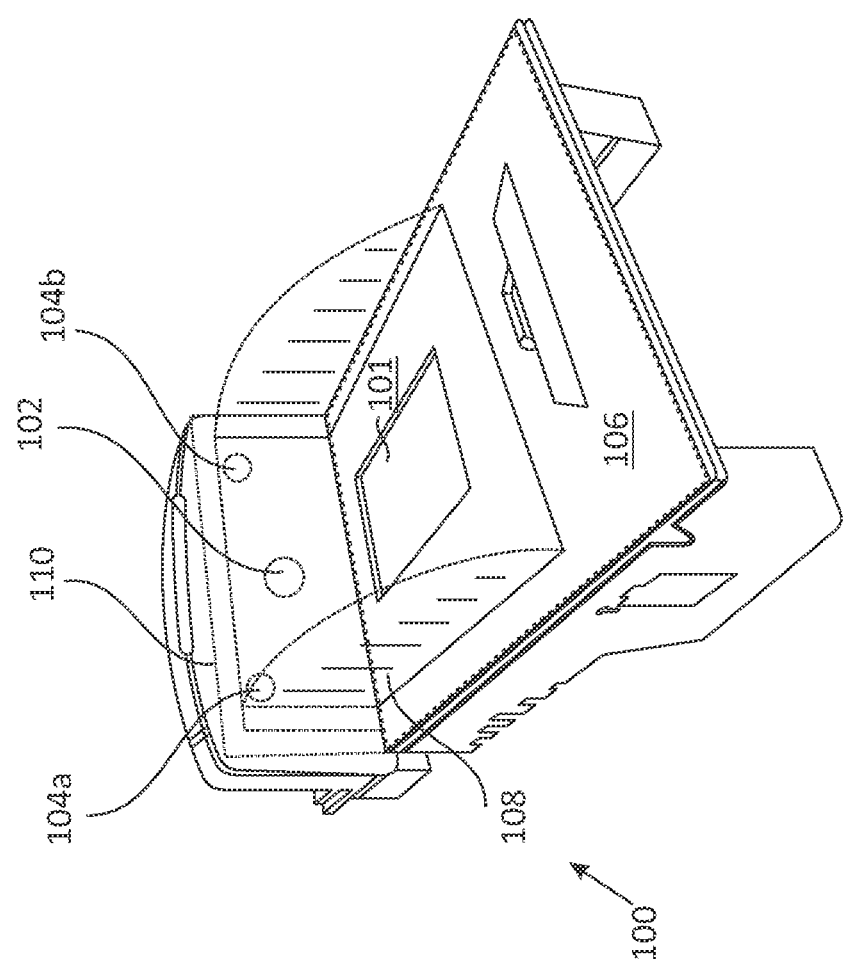
FIG. 1A illustrates a self-check out (SCO) terminal, in accordance with an embodiment of the present disclosure.

Referring to FIG. 1A, there is shown an SCO terminal 100 configured to enable a customer to scan and bill one or more objects present in their shopping cart. The SCO terminal 100 includes a scanner 101, a video camera 102, first and second proximity sensors 104a and 104b, a first region 106 (hereinafter also referred to as a barcode scanner area), and a second region 110 (hereinafter also referred to as video camera and proximity sensor perpendicular area). In an embodiment of the present disclosure, the scanner 101 includes a table-mounted bar code scanner for enabling a customer to scan Universal Product Codes (UPC) of one or more objects, and is arranged in a horizontal orientation relative to the user. In the context of the present disclosure, the first region 106 is a region in front of the scanner 101 where the user brings objects for scanning for the purpose of buying of those objects.

The video camera 102 is disposed proximally to the scanner 101 for recording video footage of the area proximal to the scanner 101 for detecting movement of a user's hand and/or objects, at a sampling rate of, for example, 30 fps, and with at least 480×300 pixel resolution. However, the person skilled in the art will understand that these figures for the image resolution and sampling rate are provided for example purposes only. Specifically, the skilled person will understand that the preferred embodiment is in no way limited to this image resolution and sampling rate.

In an embodiment, the video camera 102 is disposed perpendicularly to the scanner 101 and in an abutting or slightly elevated arrangement with respect to the scanner 101, such that the video camera 102 is further arranged so that it points towards the scanning plane of the scanner 101. For further example, the video camera 102 may comprise a video camera unit including two or more spaced apart video cameras disposed at a greater elevation than the scanner 101, without being positioned overhead the customer or otherwise arranged in a position that would compromise the privacy of the customer. Alternatively, or additionally, the video camera 102 may be arranged at a position opposing that shown in FIG. 1A and more specifically disposed proximally to the user and pointing towards the scanner 101. The person skilled in the art will understand that the above-mentioned arrangements of the video camera 102 and the arrangement depicted in FIG. 1A are provided for example purposes only. In particular, the skilled person will understand that the preferred embodiment is in no way limited to these arrangements of the video camera 102 relative to the scanner 101. On the contrary, the preferred embodiment is operable with any arrangement of the video camera 102 and the scanner 101 which enables the video camera 102 to capture video footage of an area proximal to and preferably overseeing the scanner 101.

Each of the first and second proximity sensors 104a and 104b are disposed proximally to the video camera 102 and are configured to detect the presence of nearby objects without requiring physical contact therewith. For example, the proximity sensors 104a and 104b may comprise infrared sensors, ultrasonic sensors or electrical sensors such as capacitive or inductive sensors. However, the person skilled in the art will understand that the preferred embodiment is not limited to the above-mentioned sensors. Instead, the preferred embodiment is operable with any sensors capable of detecting the proximity of an object without requiring contact therewith.

The first and second proximity sensors 104a and 104b may be integral with or separate to the video camera 102 to define an area of action (AoA) 108 disposed above the scanner 101. The first and second proximity sensors 104a and 104b may also be arranged adjacent to each other to form a composite proximity sensor, or in a spaced apart arrangement. Specifically, the first and second proximity sensors 104a and 104b may be disposed on either side of the video camera 102 or on a single side of the video camera 102. Similarly, the first and second proximity sensors 104a and 104b may be disposed co-axially with the video camera 102 or along another axis thereto. Furthermore, the first and second proximity sensors 104a and 104b may be mounted on opposing additional upright side members (not shown) embracing the scanner 101 in a co-axial or axially spaced arrangement. However, the skilled person will understand that the above-mentioned arrangements of the first and second proximity sensors 104a and 104b are provided for example purposes only. Specifically, the skilled person will understand that the preferred embodiment is in no way limited to these arrangements of the first and second proximity sensors 104a and 104b. Instead, the preferred embodiment is operable with any arrangement of the first and second proximity sensors 104a and 104b which enables detection of an object located proximally to the scanner 101.

Figure 1C:
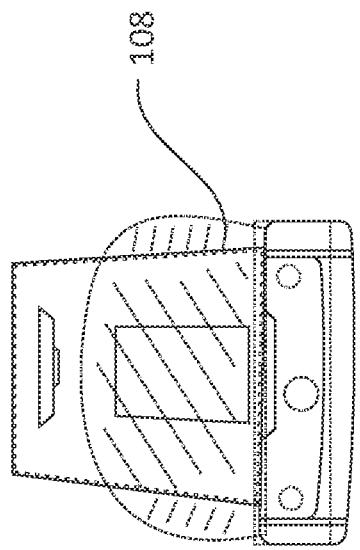
FIGS. 1B and 1C illustrate an overhead view of a Field of View (FOV) of the video camera, and an overhead view of an Area of Action (AoA) of the proximity sensors, respectively, in accordance with an embodiment of the present disclosure.
Figure 1B:
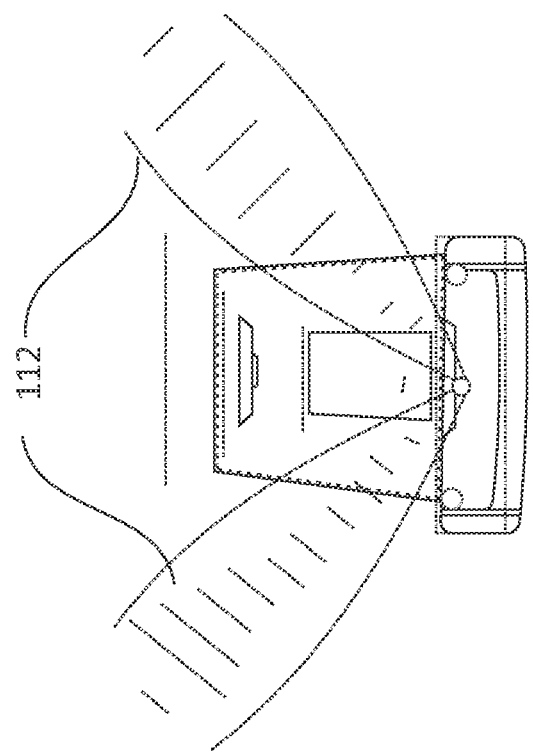

FIG. 1B illustrates an exemplary overhead view of a Field of View (FoV) 112 of the video camera 102, and FIG. 1C illustrates an exemplary overhead view of an AoA 108 respectively. The AoA 108 is defined by the detection volume of the proximity sensors 104a, and 104b, and is of smaller volume than the FoV 112. Furthermore, since an image is only captured of an object when it is in the field of AoA 108, fish-eye view distortion (which predominantly effects the peripheries of the FoV 112) will not have a deleterious effect on images of such objects.

The skilled person will understand that the above-described configuration of the AoA 108 and the FoV 112 are provided for example purposes only. In particular, the skilled person will understand that the preferred embodiment is in no way limited to this configuration of the AoA 108 and the FoV 112. On the contrary, the preferred embodiment is operable with any configuration of the AoA 108 and the FoV 112 which enables detection of the presence of an object in an area proximal to the scanner 101 and capture of image(s)/video frame(s) of the object. Other possible configurations of the AoA 108 and the FoV 112 could include a substantially cylindrical FoV 112 (associated with an elevated positioning of the video camera 102). Similarly, the AoA 108 could include a plurality of partially or completely overlapping wedge-shaped AoA components, wherein the narrower end of an AoA component may be directed towards the user or in the opposite direction thereto, or successive AoA components could be arranged in alternating directions according to the configurations of the proximity sensors 104a, and 104b. Alternatively, the AoA 108 may be substantially circular or may comprise a plurality of substantially circular AoA 108 components or other shapes tessellated to substantially cover the area occupied by and proximal to the scanner 101.

Referring back to FIG. 1A, the scanner 101 operates in two states, in that in the first state, the scanner 101 scans a UPC label of an object, and in the second state, the scanner 101 does not scan a UPC label of an object. When the scanner 101 scans a UPC label of an object, it generates Point of Sale (POS) data. The POS data includes a plurality of SCO-related variables which enable detection of a scanning incident and its timing, together with an identifier of the object scanned. In an example, the POS data is initially assigned one or more values of zero, until a UPC label is scanned by the scanner 101. In yet another embodiment, the POS data is initially empty of values until a UPC label is scanned by the scanner 101. It would be apparent to one of ordinary skilled in the art, that the above SCO-related variables are provided for example purposes only, and are in no way limiting. Further, the video camera 102 starts capturing the image/video of the area near to the scanner 101 upon receiving a triggering signal, that is generated by the first, and second proximity sensors 104a and 104b.

Figure 2:
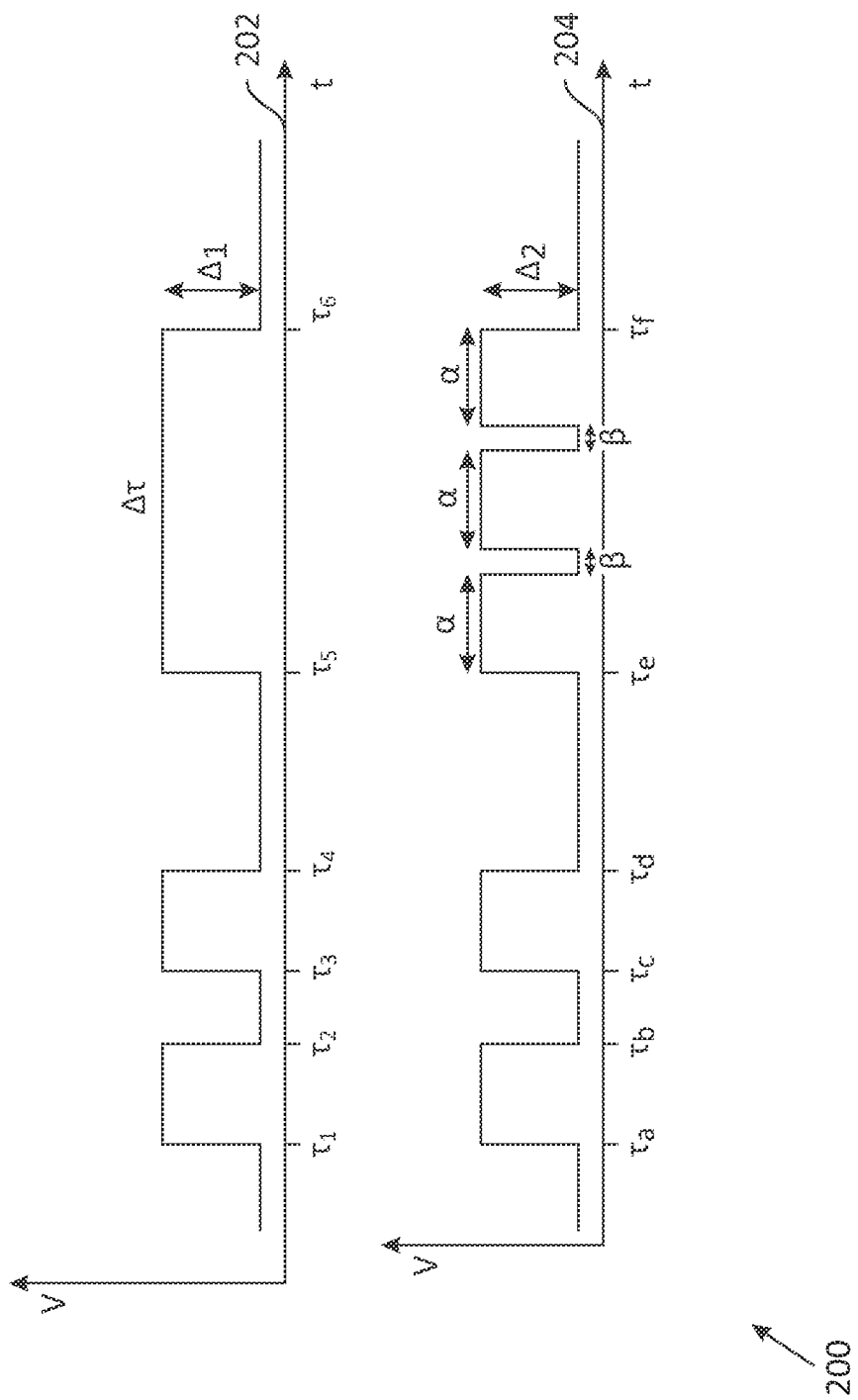
FIG. 2 is an exemplary timing diagram of a respective triggering signal from a first and second proximity sensor of the preferred embodiment and an image capture activation signal of a video camera in the preferred embodiment.

FIG. 2 is an exemplary timing diagram of the triggering signal 202 and an image capture activation signal 204 of the video camera 102, in accordance with an embodiment of the present disclosure.

Referring to FIGS. 1A-1C and 2 together, the triggering signal 202 remains at a baseline level until an object is detected in the AoA 108 by the first and/or second proximity sensors 104a, and 104b. Upon detection of an object in the AoA 108 at time $\tau_1$, the triggering signal 202 is escalated to an active level. The baseline level may differ from the active level by a user-configurable amount $\Delta_1$ which could be a either a difference in current or in voltage. For example, the baseline level could be 0 volts and the active level could be 5 volts. The skilled person will understand that these values for the baseline level and active level are provided for example purposes only. In particular, the skilled person will understand that the preferred embodiment is in no way limited to these values for the baseline level and active level. Instead, the preferred embodiment is operable with any value of the baseline level and active level of the triggering signal 202 which indicates a difference between a first state in which an object is not detected in the AoA 108 by the first and/or second proximity sensors 104a, and 104b, and a second state in which an object is detected in the AoA 108 by the first and/or second proximity sensors 104a, and 104b.

The triggering signal 202 remains at the active level until the object leaves the AoA 108 at time $\tau_2$, at which point, the triggering signal 202 returns to its baseline level. If the same object or another object enter the AoA 108, at a later time $\tau_3$ or $\tau_5$, the triggering signal 202 may be escalated again to the active level, until the object leaves the AoA 108 at time $\tau_4$ or $\tau_6$ at which point the triggering signal 202 returns to the baseline level.

The video camera 102 receives the triggering signal 202 and generates an image capture activation signal 204 based on the level of the triggering signal 202. Specifically, if the triggering signal 202 is substantially at the baseline level, the image capture activation signal 204 is set to a baseline level. However, upon receipt of the triggering signal 202 at the active level (at time $\tau_a$, where $\tau_a \geq \tau_1$), the image capture activation signal 204 is escalated to an active level. The baseline level differs from the active level by a user-configurable amount $\Delta_2$ which could be a either a difference in current or in voltage. For example, the baseline level could be 0 volts and the active level could be 5 volts. The video camera 102 starts recording image(s)/video frame(s) upon escalation of the image capture activation signal to the activation level, and stops recording image(s)/video frame(s) upon returning of the image capture activation signal to the baseline level. Thus, the video camera 102 is activated to record recording image(s)/video frame(s) only when an object enters the AoA 108.

The skilled person will understand that these values of the baseline level and active level are provided for example purposes only. In particular, the skilled person will understand that the preferred embodiment is in no way limited to these values of the baseline level and active level. On the contrary, the preferred embodiment is operable with any value of the baseline level and active level of the image capture activation signal 204 which indicates a difference between a first state in which an object is not detected in the AoA 108 by the first and/or second proximity sensors 104a, and 104b, and a second state in which an object is detected in the AoA 108 by the first and/or second proximity sensors 104a, and 104b.

Upon receipt of the triggering signal 202 that has returned to the baseline level (at time $\tau_b$, where $\tau_b \geq \tau_2$), the image capture activation signal 204 is also returned to the baseline level. In another embodiment, if the triggering signal 202 remains at the active level for a period $\Delta\tau$ exceeding a pre-defined threshold $\alpha$ (for example, 15-20 seconds), the image capture activation signal 204 is returned to the baseline level for a cooling period $\beta$ of, for example, 2 seconds duration to allow the video camera 102 to cool down to prevent over-heating.

If the triggering signal 202 remains at the active level after the end of the cooling period, the image capture activation signal is returned to the active level. Based on the relative durations of $\Delta\tau$, $\alpha$ and $\beta$, this process may be repeated several times while the triggering signal 202 remains at the active level. Thus, should an object remain in the AoA 108 for a protracted period, the image capture activation signal 204 can be cyclically reset during this period.

The skilled person will understand that the above-mentioned values of $\alpha$ and $\beta$ are provided for example purposes only. Specifically, the preferred embodiment is in no way limited to these values of $\alpha$ and $\beta$. On the contrary, the preferred embodiment is operable with any values of $\alpha$ and $\beta$ suitable to permit periodic re-setting of the video camera 102.

Figure 3:
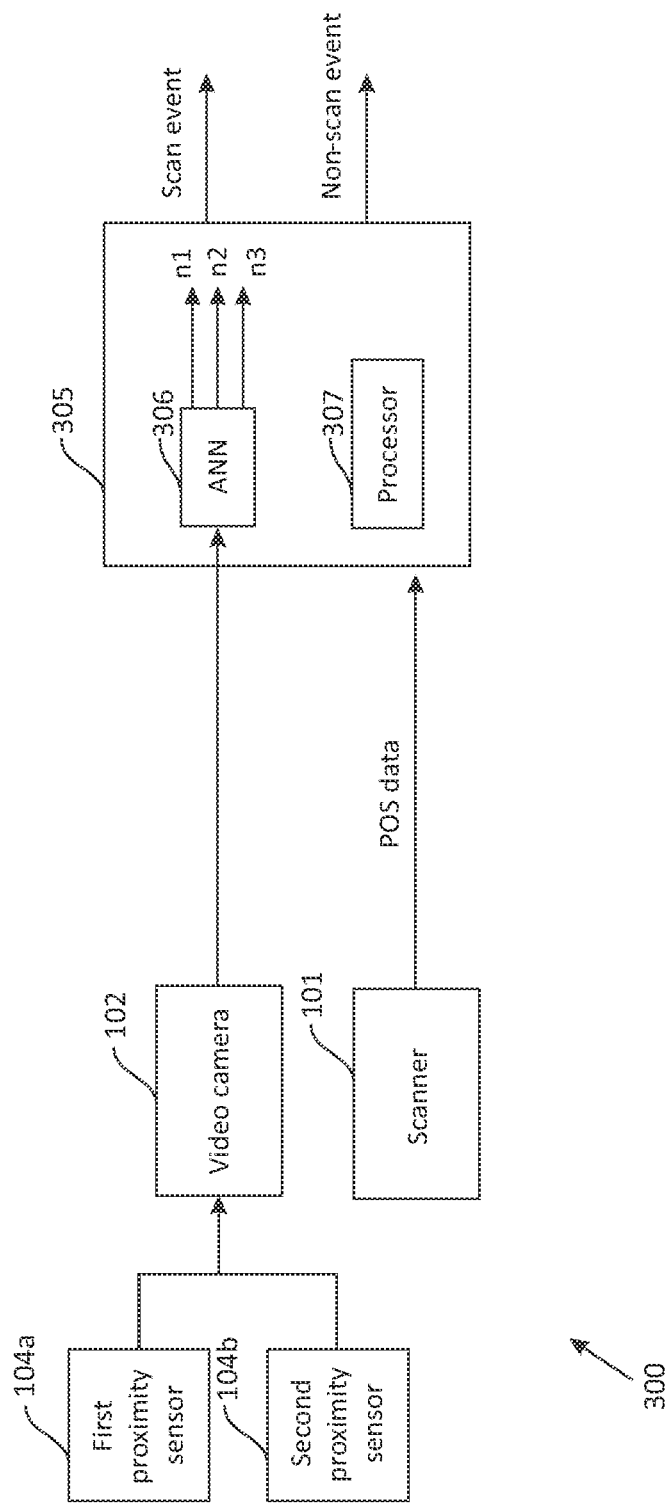
FIG. 3 is a block diagram illustrating a system for detecting scan and non-scan events in an SCO process, in accordance with an embodiment of the present disclosure.

FIG. 3 is a block diagram illustrating a system 300 for detecting scan and non-scan events in an SCO process of the SCO terminal 100 of the present disclosure. The system 300 may be either integrated with the SCO terminal 100, or communicatively coupled thereto.

Referring to FIG. 3 together with FIG. 1A, the system 300 includes a video camera 102 for capturing one or more images (or video frames) of one or more products brought close to the scanner 101 for scanning the one or more products. The video camera 102 is triggered by the first and second proximity sensors 104a and 104b. In an embodiment of the present disclosure, the scanner 101 is configured to generate POS data upon scanning of the product's barcode by the scanner 101.

The system 300 further includes a processing unit 305 that may be implemented locally at a local computing device, or at a remote processing server. In the context of the present disclosure, the processing unit 305 may include an AI based processor, a graphical processing unit (GPU) for processing video/image data, a memory for storing one or more instructions. Throughout the present disclosure, the term 'AI based processor' relates to a computational element that is operable to respond to and process instructions stored in a corresponding memory. Optionally, the AI based processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. The processing unit 305 may include an initial set of pre-defined outputs programmed and augmented with dynamic outputs created by corresponding AI software.

The processing unit 305 includes an Artificial neural network (ANN) 306 which includes one or more convolutional layers, coupled with a fully connected output layer. The ANN 306 is pre-trained on one or more pre-defined training data sets. A training data set comprises a plurality of images/video frames of incidents relating to the scanner 101. Specifically, an incident may comprise the presence of a hand within a region that is at least partially within the FoV of the video camera 102, wherein the hand may hold an object or the hand may be empty. Alternatively, the incident may comprise the presence of an object within a region that is at least partially within the FoV 112 of the video camera 102, without the presence of a hand.

In an embodiment of the present disclosure, the training data set includes images captured under a variety of different lighting and background conditions to reduce the risk of network/model bias. The training data set may include images/video frames of a wide variety of objects of different colour, size and shape, and in which objects are held in different orientations relative to the scanner 101, and more especially with the objects' barcodes disposed in different orientations relative to the scanner 101. The training data set may further include images/video frames which include a diverse range of users and user movements (including movements of a variety of user's body parts) in connection with the scanner 101. The training data set may further include images/video frames that show features such as body parts and clothing, that are unrelated to a scanning activity, since these features may appear in images captured by the system in later use, because the FoV 112 (see, FIG. 1B) of the video camera 102 does not focus on the entire AoA 108 of the first and second proximity sensors 104a and 104b. The training data set may also be extended using augmentation techniques, such as image flipping, applying noise filters and color filters etc. Similarly, video frames sampled at random intervals from the video camera 102 may be used in the training data set to minimise correlation between the said video frames. Collectively, the training data set may be designed to express a balanced representation of the diversity of scenarios in which a user might engage with the scanner 101. Specifically, the training data set is designed to represent a variety of scenarios in which a user might scan an object's barcode with the scanner 101, or a user might pass an object close to the scanner 101 without the object's barcode being scanned by the scanner 101, or a user might move their hands to a location close to the scanner 101 without the hand(s) holding an object.

To address the risk of scenario misclassification based on an analysis of a single image/video frame, the training data set may comprise a plurality of successively recorded video frames (hereinafter referred to as a video footage component) of an observed scenario. Indeed, to further improve the classification performance of the ANN 306 the training data set may comprise video footage components of varying duration (i.e. comprising varying numbers of images/video frames). To further ensure that the training data set is the closest representation to the video footage likely to be captured during the later use of the system, empty scanner video frames (i.e. video frames in which no objects or body parts are visible) are added to the start and end of each video footage component in the training data set.

In each case, an image/video frame in the training data set is accompanied by a class label as established by a human reviewer of the image/video frame. The class label includes three variables denoting the probability as established by a human reviewer, that the image/video frame(s) represents each of three scenarios "Empty hand", "Hand with object" and "No hand" respectively. The "empty hand" represents presence of an empty hand proximal to the scanner 101, "the hand with object" represents a hand that is holding an object proximal to the scanner 101, and "no hand" represents a hand not being present or visible to the video camera 102.

In an embodiment of the present disclosure, an image/video frame is assigned a class label "Empty hand" if the image/video frame shows one or more of a range of hand postures comprising scan-specific and random movements undertaken at different distances from the video camera 102, or the image/video frame shows one or more different hand postures in which the hand holds objects that may differ in size, shape, color and transparency, or the image/video frame shows a hand without other objects being visible, wherein the posture of the hand suggests the presence of a small object in the hand (i.e. the object is essentially concealed within the palm of the hand).

It may be noted, that certain small objects can be held in a closed hand without being seen, or can be held in awkward positions so that only a tiny part of the object is seen. The inclusion in the training data set of images/video frames showing hands in postures indicative of them holding something that is otherwise not visible, produces a more heterogeneous training data set for the "Hand with object" scenario. Thus, the ANN 306 is trained to recognize instances in which an object is not visible, but the posture of the hand suggests that an object is hidden therein, so that the ANN 306 does not subsequently require an object to be visible (e.g. bag dangling below hand) to detect the presence of the object.

In another embodiment of the present disclosure, an image/video frame of the training data set is given a class label consonant with a "No hand" scenario if the image/video frame shows one or more random objects or body parts but no hand(s) or part(s) thereof. The image frames devoid of objects or body parts may also be given a class label consonant with a "No hand" scenario, because such video frames may also occur towards the end of a transaction, before the triggering signal of the first and/or second proximity sensors 104a and 104b returns to its baseline level (i.e. indicating that the first and/or second proximity sensors 104a and 104b no longer detect the presence of an object).

The skilled person will understand that the above composition of the images in the training data set and their corresponding class labels is provided for example purposes only. In particular, the preferred embodiment is in no way limited to this composition of the images and corresponding class labels. Instead, the preferred embodiment is operable with any composition of images in the training data set and/or corresponding class labels which enables a distinction to be made between the above-mentioned incidents relating to the scanner 101.

Furthermore, the class labels may be expanded to include a larger number of variables to thereby provide a finer classification granularity of scenarios of user engagement with the scanner 101, for example, a plurality of objects in the user's hand, object label facing upwards or sideways, and size/type of object etc. Using this finer classification granularity, the ANN 306 may, for example, provide greater insight into situations where users find it difficult to scan bulky products or otherwise unwieldy products, or newly emerging techniques (including hand/body movements) used by fraudsters to avoid paying for products at the SCO terminal 100.

Using the training data set and/or further similar data set(s), the ANN 306 is trained to establish an internal representation of a relationship between features of a viewed image/video frame and the probability of the image/video frame representing an "Empty hand", "Hand with object" or "No hand" scenario, wherein the internal representation formed by the ANN 306 is comparable to a conceptual relationship employed by a human operator viewing the same image. In this way, the ANN 306 is configured to receive image(s)/video frame(s) from the video camera 102 and to generate therefrom values of first, second and third output variables n1, n2 and n3 indicating the probability of each image/video frame representing an "Empty hand', 'Hand with object' and 'No hand' scenario class respectively. In an example, if $n_1=30\%$, $n_2=40\%$, and $n_3=30\%$, then the observed scenario represented by the image/video frame(s) is most likely that of class 'hand with object'.

In most cases, the scanning of an object requires the object to be held above the scanner area 106 and in the AoA 108. Similarly, most of the time, the holding of an object requires the use of hand(s). Sometimes, the proximity sensors 104a and 104b can be accidentally triggered, for example, accidental activation of a proximity sensor with a body part, or an empty hand to generate a false non-scan state. With this in mind, the output variables from the ANN 306 and the corresponding variables of the class labels of the training data set, include variables specifically relating to a status of a user's hand(s), most notably whether the hand(s) are empty or holding an object. The inclusion of such hand status variables in the output variables from the ANN 306 and the corresponding variables of the class labels of the training data set enables the ANN 306 to differentiate between a false non-scan state and a genuine non-scan state, and more specifically to reduce the number of false non-scan state findings (arising from the accidental triggering of the proximity sensors 104a and 104b). Furthermore, the training of the ANN 306 to detect and accommodate the presence of a hand in an image/video frame, enables the ANN 306 to form a more naturalistic representation of the environment in which the SCO terminal 100 would be used in real-life, rather than an artificial, disembodied appearance of an object in a video frame without reference to the hands that would normally hold it.

Also, the presence of a hand in an image/video frame, indicates a degree of intention on the part of the user which could be used to identify the activity of scanning an object as opposed to randomly moving an object in the FoV 112 of the video camera 102. By overtly identifying the scanning activity, it is possible to more precisely establish the commencement and ending temporal boundaries around the activity. This will enable the measurement interval of the activity to be more precisely established.

On completion of training, the ANN 306 is configured to receive previously unseen image(s)/video frame(s) from the video camera 102. Based on the hardware deployed to run the ANN 306, the system 300 may be configured to periodically sample a video stream received from the video camera 102 and transmit the samples to the ANN 306 instead of the video stream, if the ANN 306 cannot process all the frames of the video stream in real time. For example, if the video camera 102 has a sampling rate of 30 fps, then only 15 frames per second may be processed by the ANN 306. The value of the output variables of the ANN 306 may change between individual image(s)/video frame(s) captured during a given scanning activity event, as the user's hand rotates or shakes etc. on moving an object proximal to the scanner 101. Thus, a particular challenge is distinguishing between a genuine non-scan state, wherein a hand holds an object proximal to the scanner 101 but the scanner 101 fails to sound, and a false non-scan state, i.e. wherein an empty hand is mistakenly classified as being a hand holding an object and the scanner 101 fails to sound.

More specifically, using the above framework for training, the ANN 306 is configured to generate a classification of a scenario represented by a received image/video frame, with the following equation:

$$Nj(t)=P(t)(Cjli) \qquad (1)$$

where Nj(t) is the output (n1, n2 or n3) generated by the ANN 306 at time t, and P(t)(Cjli) is the probability of class j for given input i, at time t.

The skilled person will understand that the above equation is provided for example purposes only. In particular, the skilled person will understand that the preferred embodiment is in no way limited to this equation. Instead, the preferred embodiment is operable with any equation denoting the internal representation formed in the ANN 306. For example, the above equation may be expanded to embrace an increased number of output variables, as described above, to provide a finer classification granularity of scenarios represented by an image/video frame received by the ANN 306.

The skilled person will understand that the above-described configuration of the output variables from the ANN 306 is provided for example only. In particular, the preferred embodiment is in no way limited to the above-described number of output variables or probabilistic meaning thereof. Specifically, and in an analogous manner to the class labels of the training data set, the number of output variables from the ANN 306 may be increased to provide a finer classification granularity of scenarios represented by an image/video frame received by the ANN 306. For example, the ANN 306 may include an additional output variable to represent the probability of a user's hand holding a plurality of objects or the probability of object(s) being held so that the object(s)' barcode label(s) are facing away from, or at angle to, the scanner 101.

A processor 307 in the processing unit 305, receives the first, second, and third output values n1, n2 and n3 from the ANN 306, and POS data from the scanner 101. For brevity, the first, second, and third output values n1, n2 and n3; and the POS data are hereinafter collectively referred to as processing unit input variables. The processor 307 is configured to process the processing unit input variables to detect a correlation therebetween the video data and the POS data, and to generate two or more binary output variables designating the occurrence of a scan event or a non-scan event. For brevity, the output variable designating the occurrence of a scan event may be hereinafter referred to as a "Scan event output variable". Similarly, the output variable designating the occurrence of a non-scan event may be hereinafter referred to as a "Non-scan event output variable". In an embodiment of the present invention, the processor 307 is further configured to generate an alert when a non-scan event occurs. The alert may include at least one of: a pre-defined audio played through a speaker, a pre-defined video displayed on a display device, an instant message to a store operator, and an email/SMS to the store operator.

In an example, a scan event output variable with a value of 1 indicates that a user has entered the AoA 108 (FIG. 1A) with an object in hand, and that the object's barcode was sensed by the scanner 101. Similarly, a non-scan event output variable with a value of 1 indicates that a user entered the AoA 108 with an object in hand, and that the object's barcode was not sensed by the scanner 101 (FIG. 1A).

Figure 4:
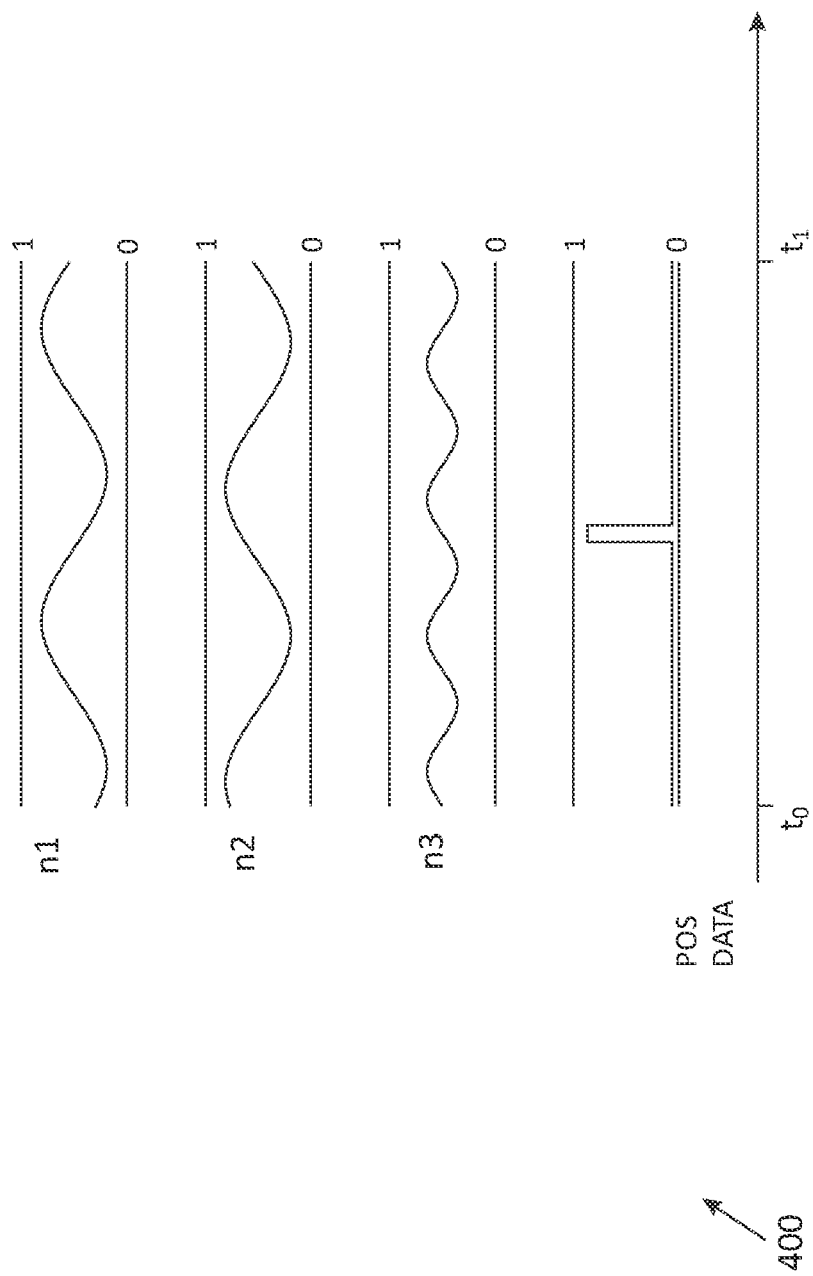
FIG. 4 illustrates a visual representation of output values of the system of FIG. 3, in accordance with an embodiment of the present disclosure.

FIG. 4 illustrates a visual representation 400 of first, second, and third values, n1, n2 and n3, and POS data, in accordance with an embodiment of the present disclosure, wherein t0 and $t_1$ are timestamps defined by the activation and deactivation of the first and second proximity sensors 104a and 104b.

In a first example, when n2 is greater than n1 and n3 over at least t % of the measurement interval [$t_0$, $t_1$], and the POS data is zero-valued (or empty of values) over the whole measurement interval, then the processor 307 generates a value of 1 for the non-scan event output variable and a value of 0 for the scan event output variable. In a second example, when n2 is greater than n1 and n3, over at least t % of the measurement interval [$t_0$, $t_1$], and the POS data comprises at least one value greater than zero during the whole interval, then the processor 307 generates a value of 1 for the scan event output variable and a value of 0 for the non-scan event output variable. In a third example, where no hand holding an object is visible in the FoV 112 (and consequently nothing relevant from a scanning perspective is happening), the processor 307 generates a value of 0 for both the non-scan event output variable and the scan event output variable.

The t % threshold on the number of video frames captured during an observed event in which a particular classification is determined, is used to establish a minimum confidence level on the correctness of the classification as applied to the observed event in its entirety. In an example, it was found that it took between 2 and 14 seconds to scan an object by the scanner 101, wherein an average scan time is 4 seconds per object. When the maximum duration of recording is assumed to be 20 seconds, the t % threshold can be between 2/20 and 14/20. As previously discussed, the greater the number of frames in which the ANN 306 produced a "Hand with Object" classification as compared to the total number of frames in the observed event, the greater the confidence in the "Hand with Object" classification. Therefore, it is preferable to keep the threshold (t %) as low as possible. However, to filter out more complex incidents leading to false scan states, the threshold cannot be kept as low as 2/20. Therefore, it is preferable to use the average of 4 seconds to create an optimal threshold, so that t % threshold is 4/20 (i.e. 20%).

The skilled person will understand that the above configurations of n1, n2 and n3 and corresponding values of the scan event output variable and the non-scan event output variable are provided for example purposes only. In particular, the skilled person will understand that the preferred embodiment is in no way limited to these configurations of n1, n2 and n3 and values of the scan event output variable and the non-scan event output variable. Instead, the preferred embodiment is operable with any configuration of n1, n2 and n3 and corresponding values of the scan event output variable and the non-scan event output variable capable of distinguishing between an incident in which an object held close to a scanner is not scanned thereby, and an incident in which an object held close to a scanner is scanned thereby.

For example, the preferred embodiment is operable with a broader set of conditions for establishing the values of the scan event output variable and the non-scan event output variable in the event the ANN 306 produces an expanded set of output variables. Alternatively, the scan event output variable and the non-scan event output variable could be analogue variables whose values could reflect the degree of confidence in the classification of an incident as being one in which an object was scanned by the scanner or one in which an object was not scanned by the scanner. Recognizing the potential for noise in the measurements, the rules for establishing value(s) of the scan event output variable and the non-scan event output variable may not rely on the POS data having a particular value over a whole measurement interval. Instead, it may be sufficient if the POS data has a particular value for a pre-defined percentage of the measurement interval.

Similarly, the rules for establishing the value(s) of the scan event output variable and the non-scan event output variable may not rely on the POS data having a value of zero (or being empty of values) or greater than zero. Instead, the rules may accommodate other baseline values of the POS data for situations where a UPC label has not been scanned by the scanner 101. Further, the rules may accommodate other differential measures of the POS data between a first state in which a UPC label has not been scanned by the scanner 101, and a second state in which a UPC label has been scanned by the scanner 101.

Figure 5:
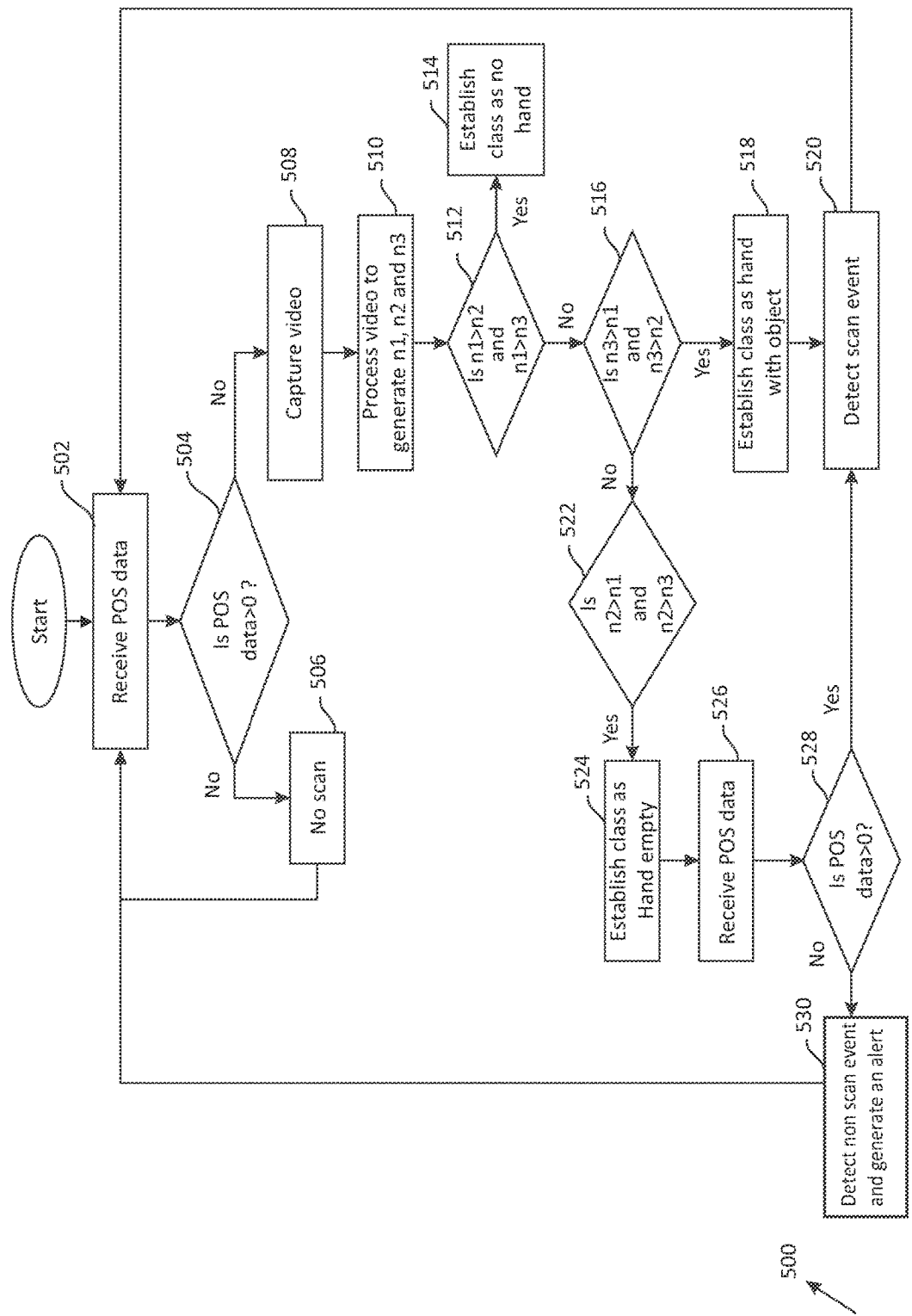
FIG. 5 is a flowchart of a method of detecting scan and non-scan events in an SCO process, in accordance with an embodiment of the present disclosure.

FIG. 5 is a flowchart of a method 500 of detecting scan and non-scan events during scanning by the scanner 101, in accordance with an embodiment of the present disclosure. The method 500 has been explained in conjunction with FIG. 1A and FIG. 3.

At step 502, a sample of POS data is received from the scanner 101 of the SCO terminal 100. The POS data includes a plurality of SCO-related variables which enable detection of a scanning incident and its timing, together with an identifier of the object scanned.

At step 504, it is checked if the POS data includes one or more values of zero or is empty of values. When the POS data include zero values, then it is established at step 506, that no scan event has taken place, and method moves to step 502.

At step 508, video footage is captured by a video camera 102 in the event the sample of POS data includes one or more values of greater than zero.

At step 510, the video frame from the video footage is processed by the ANN 306 to generate the first, second and third output variables n1, n2 and n3 corresponding to classes "no hand", "hand empty" and "hand with object" respectively.

At step 512, it is checked if the first output variable n1 is greater than both the second and third output variables n2 and n3. At step 514, the class is established as 'no hand" if the first output variable n1 is greater than both the second and third output variables n2 and n3, and the method moves to step 502.

At step 516, it is checked if the third output variable n3 is greater than both the first and second output variables n1 and n2, if the first output variable n1 is not found greater than both the second and third output variables n2 and n3.

At step 518, the class is established as 'hand with object' when the third output variable n3 is greater than both the first and second output variables n1 and n2. The 'hand with object' is a scenario in which hands are visible and contain an object, thereby establishing at step 520, that a scan event has occurred, and then moving to step 502.

When the third output variable n3 is not greater than both the first and second output variables n1 and n2, then at step 522, it is checked if the second output variable n2 is greater than both the first and third output variables n1 and n3.

When the second output variable n2 is greater than both the first and third output variables n1 and n3, then at step 524, the class is established as 'hand empty', and then at step 526, further samples of POS data are received, and it is checked at step 528, if the further samples of POS data include one or more non-zero values. When the further POS data includes one or more non-zero values, then at step 520, a scan event is detected. When the further POS data does not include one or more non-zero values, then at step 530, a non-scan event is detected and an alert is generated. The alert may include at least one of: a pre-defined audio played through a speaker, a pre-defined video displayed on a display device, an instant message to a store operator, and an email/SMS to the store operator. The POS data could be checked for a whole measurement interval, or a predefined portion of the measurement interval.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for detecting scan and non-scan events in a self-check out (SCO) process, comprising:
   a scanner configured to scan one or more objects brought up in a scanning region, and configured to generate point of sale (POS) data based on the scanning;
   a video camera disposed perpendicularly to the scanner and in an elevated arrangement with respect to the scanner, configured to generate a video frame of the scanning region;
   two or more proximity sensors disposed on either sides of the video camera and operable to define an Area of Action (AoA) disposed above the scanner,
   wherein the video camera is configured to start capturing the scanning region to generate the video frame based on a trigger signal generated by the two or more proximity sensors when the one or more objects enter the AoA,
   wherein the scanner generates the POS data of the one or more objects, and
   wherein the POS data includes one or more non-zero values;

a processing unit comprising an Artificial neural network (ANN) configured to receive an image frame from the video frame generated by the video camera, and generate one or more values, each indicating a probability of classification of the image frame into one or more classes respectively; and the processing unit is configured to:
receive and process the POS data, and one or more probabilities of one or more classes to detect a correlation between video frame generated by the video camera and the POS data,
detect one of: a scan and a non-scan event in the image frame based on the correlation, and
generate an alert upon detection of the non-scan event.

2. The system of claim 1, wherein the one or more values include first, second and third output variables corresponding to classes 'no hand', 'hand empty' and 'hand with object" respectively, wherein the 'empty hand' indicates a presence of an empty hand in the image frame, 'the hand with object' indicates a hand that holds an object in the image frame, and "no hand" indicates a hand not being visible in the image frame.

3. The system of claim 2, wherein the processing unit is configured to:
establish a class of the image frame as 'no hand' when the first output variable is greater than both the second and third output variables; and
not detect the scan and the non-scan event in the image frame when the class of the image frame is 'no hand'.

4. The system of claim 2, wherein the processing unit is configured to:
establish a class of the image frame as 'hand with object' when the third output variable is greater than both the first and second output variables; and
detect the scan event in the image frame when the class is 'hand with object'.

5. The system of claim 2, wherein the processing unit is configured to:
establish a class of the image frame as 'empty hand' when the second output variable is greater than both the first and third output variables;
receive further POS data;
check if the further POS data includes one or more non-zero values;
detect the scan event in the image frame when the further POS data includes one or more non-zero values; and
detect the non-scan event in the image frame when the further POS data does not include one or more non-zero values.

6. The system of claim 2, wherein the ANN is configured to classify the image frame in class 'hand with object' when the object is not visible in the image frame and a posture of user hand includes an object hidden therein.

7. The system of claim 2, wherein the processing unit is configured to identify a false non-scan event generated based on an accidental triggering of a proximity sensor with a body part, or an empty hand.

8. The system of claim 2, wherein the ANN is configured to generate an additional output variable to represent the probability of a user's hand holding a plurality of objects.

9. The system of claim 1, wherein the two or more proximity sensors include first and second proximity sensors arranged adjacent to each other, or in a spaced apart arrangement, and are configured to define a detection volume that is less than that of the field of view of the video camera.

10. The system of claim 1, wherein the POS data includes an indicator of a scanning incident, a timing of the scanning incident, and an identifier of an object scanned.

11. The system of claim 1, wherein the two or more proximity sensors are configured to generate a triggering signal when the one or more objects enters the AoA, and the video camera is configured to generate an image capture activation signal based on the triggering signal, wherein the image capture activation signal is configured to be cyclically reset with a predefined cooling period to allow the video camera to cool down.

12. The system of claim 1, wherein the ANN is pre-trained on one or more pre-defined training data sets that include a plurality of images/video frames of incidents relating to the scanner, wherein an incident includes a presence of a hand within a region that is at least partially within the field of view of the video camera, and wherein an incident includes a presence of an object within a region that is at least partially within the field of view of the video camera without the presence of a hand.

13. The system of claim 1, wherein the ANN is pre-trained on one or more pre-defined training data sets that include a plurality of images captured under a plurality of lighting and background conditions, a plurality of images of one or more objects of a plurality of colours, sizes and shapes, a plurality of images of one or more objects held in a plurality of orientations relative to the scanner, and a plurality of images of one or more user movements relative to the scanner.

14. A method for detecting scan and non-scan events in a self-check out (SCO) process, comprising:
scanning, by a scanner, one or more objects brought up in a scanning region, and generating point of sale (POS) data based on the scanning;
generating, by a video camera disposed perpendicularly to the scanner and in an elevated arrangement with respect to the scanner, a video frame of the scanning region;
operably defining, by two or more proximity sensors disposed on either sides of the video camera, an Area of Action (AoA) above the scanner, wherein
the two or more proximity sensors generate a trigger signal when the one or more objects enter the AoA,
wherein the video camera generates the video frame based on the trigger signal,
wherein the scanner generates the POS data of the one or more objects, and
wherein the POS data includes one or more non-zero values;
receiving, by a processing unit comprising an Artificial neural network (ANN), an image frame from the video frame generated by the video camera and generating one or more values, each indicating a probability of classification of the image frame into one or more classes respectively;
receiving and processing, by the processing unit, the POS data, and one or more probabilities of the one or more classes to detect correlation between video frame generated by the video camera and the POS data;
detecting, by the processing unit, one of: a scan and a non-scan event in the image frame based on the correlation; and
generating, by the processing unit, an alert upon detection of the non-scan event.

15. The method of claim 14, wherein the one or more values include first, second and third output variables corresponding to classes 'no hand', 'hand empty' and 'hand with object" respectively, wherein the 'empty hand' indicates a presence of an empty hand in the image frame, 'the hand with object' indicates a hand that holds an object in the image frame, and "no hand" indicates a hand not being visible in the image frame.

16. The method of claim 15, further comprising:
    establishing, by the processing unit, a class of the image frame as 'no hand' when the first output variable is greater than both the second and third output variables; and
    not detecting, by the processing unit, the scan and the non-scan event in the image frame when the class of the image frame is 'no hand'.

17. The method of claim 15, further comprising:
    establishing, by the processing unit, a class of the image frame as 'hand with object' when the third output variable is greater than both the first and second output variables; and
    detecting, by the processing unit, the scan event in the image frame when the class is 'hand with object'.

18. The method of claim 15, further comprising:
    establishing, by the processing unit, a class of the image frame as 'empty hand' when the second output variable is greater than both the first and third output variables;
    receiving, by the processing unit, further POS data;
    checking, by the processing unit, if the further POS data includes one or more non-zero values;
    detecting, by the processing unit, the scan event in the image frame when the further POS data includes one or more non-zero values; and
    detecting, by the processing unit, the non-scan event in the image frame when the further POS data does not include one or more non-zero values.

19. The method of claim 15, further comprising generating, by the ANN, an additional output variable to represent the probability of a user's hand holding a plurality of objects.

20. The method of claim 14, wherein the POS data includes an indicator of a scanning incident, a timing of the scanning incident, and an identifier of an object scanned.

21. The method of claim 14, further comprising:
    classifying, by the ANN, the image frame in class 'hand with object' when the object is not visible in the image frame and a posture of user hand includes an object hidden therein.

22. The method of claim 14, further comprising training the ANN based on one or more pre-defined training data sets that include a plurality of images/video frames of incidents relating to the scanner, wherein an incident includes a presence of a hand within a region that is at least partially within the field of view of the video camera, and wherein an incident includes the presence of an object within a region that is at least partially within the field of view of the video camera without the presence of a hand.

23. The method of claim 14, further comprising training the ANN based on one or more pre-defined training data sets that include a plurality of images captured under a plurality of lighting and background conditions, a plurality of images of one or more objects of a plurality of colours, sizes and shapes, a plurality of images of one or more objects held in a plurality of orientations relative to the scanner, and a plurality of images of one or more user movements relative to the scanner.

24. A computer programmable product for detecting scan and non-scan events in a self-check out (SCO) process, the computer programmable product comprising a set of instructions, the set of instructions when executed by a processor causes the processor to:
    scan, by a scanner, one or more objects brought up in a scanning region, and generate point of sale (POS) data based on the scanning;
    operably define an Area of Action (AoA) above the scanning region;
    generate a triggering signal, by two or more proximity sensors disposed on either sides of a video camera, when the one or more objects enter the AoA;
    capture, by the video camera, a video frame of the scanning region upon generation of the triggering signal;
    receive an image frame from the video frame and generate one or more values, each indicating a probability of classification of the image frame into one or more classes respectively;
    receive and process the POS data, and one or more probabilities of the one or more classes to detect a correlation between video frame and the POS data;
    detect one of: a scan and a non-scan event in the image frame based on the correlation; and
    generate an alert upon detection of the non-scan event.

* * * * *